(12) United States Patent
Chen et al.

(10) Patent No.: US 10,879,825 B2
(45) Date of Patent: Dec. 29, 2020

(54) SENSORLESS POSITION MEASUREMENT SYSTEM FOR PERMANENT MAGNET MACHINE AND MEASURING METHOD THEREOF

(71) Applicant: NAROLLER ELECTRONICS CO., LTD., Taoyuan (TW)

(72) Inventors: Guan-Ren Chen, Taichung (TW); Cheng-Lung Lee, Taoyuan (TW); Hsiang-Yi Yang, Kaohsiung (TW)

(73) Assignee: NAROLLER ELECTRONICS CO., LTD., Taoyuan (TW)

( * ) Notice: Subject to any disclaimer, the term of this patent is extended or adjusted under 35 U.S.C. 154(b) by 0 days.

(21) Appl. No.: 16/371,674

(22) Filed: Apr. 1, 2019

(65) Prior Publication Data
US 2020/0313589 A1    Oct. 1, 2020

(51) Int. Cl.
*H02P 21/18* (2016.01)
*H02P 27/12* (2006.01)
*H02P 21/22* (2016.01)

(52) U.S. Cl.
CPC .............. *H02P 21/18* (2016.02); *H02P 21/22* (2016.02); *H02P 27/12* (2013.01)

(58) Field of Classification Search
CPC .................................. H02P 21/18; H02P 21/22
USPC ................................. 318/400.02, 400.01, 700
See application file for complete search history.

(56) References Cited

U.S. PATENT DOCUMENTS

| | | | | |
|---|---|---|---|---|
| 6,462,492 B1* | 10/2002 | Sakamoto | ................ | H02P 6/18 318/400.02 |
| 7,157,876 B2* | 1/2007 | Ide | ......................... | H02P 6/185 318/400.02 |
| 9,407,182 B2* | 8/2016 | Yang | ................... | H02P 21/0085 |
| 9,917,542 B2* | 3/2018 | Thomas | ................. | H02P 21/24 |

OTHER PUBLICATIONS

Chen et al., Phase Voltage Measurement for Surface Permanent Magnet Machine Position Sensorless Device, IEEE ECCE, 2018, Portland, Oregon, USA, 27 pages.

(Continued)

*Primary Examiner* — David Luo
(74) *Attorney, Agent, or Firm* — Muncy, Geissler, Olds & Lowe, P C.

(57) ABSTRACT

The sensorless position measurement system for the permanent magnet machine utilizes the preprocessing circuit to couple with the inverter for obtaining the line-to-line PWM signal supplied to the permanent magnet machine. The preprocessing circuit converts negative PWM pulses of the line-to-line PWM signal into positive PWM pulses for obtaining the converted line-to-line PWM signal. The function of the preprocessing is achieved by the differential circuit and the polarity correction circuit. The converted line-to-line PWM signal is a digital signal and captured by the capture modulator. The preprocessing circuit is substituted for the analog to digital converter. The microcontroller determines the angular position of the permanent magnet machine based on the converted line-to-line PWM signal. Overall, the sensorless position measurement system for a permanent magnet machine does not need a position sensor to determine the angular position of the permanent magnet machine, thereby reducing the size of the system.

16 Claims, 13 Drawing Sheets

(56) References Cited

OTHER PUBLICATIONS

Chen et al, Phase Voltage Measurement for Permanent Magnet Machine Sensorless Drive using Controller Capture Modulator, IEEE Transactions on Industrial Electronics, 2019, 10 pages.

Wei Sun et al., "Inverter Nonlinear Error Compensation Using Feedback Gains and Self-Tuning Estimated Current Error in Adaptive Full-Order Observer", IEEE Transactions on Industry Applications, vol. 52, No. 1, Jan./Feb. 2016, pp. 472-482.

* cited by examiner (a) command voltage (b) compensated voltage (c) reconstructed voltage (a)

(b)

SENSORLESS POSITION MEASUREMENT SYSTEM FOR PERMANENT MAGNET MACHINE AND MEASURING METHOD THEREOF

BACKGROUND OF THE INVENTION

Field of the Invention

The present invention relates to a sensorless position measurement system for permanent magnet machine utilizing a capture modulator in a microcontroller to capture an actual phase signal and estimate an angular position of the permanent magnet machine.

Description of the Related Art

In a permanent magnet machine, a position sensor is needed for determining the angular position or the speed of the permanent magnet machine. Generally, the position sensor is a rotary encoder. However, a rotary encoder is large enough to occupy much space within a system. Hence, to the elimination of the position sensor and external cables is an issue which is worthwhile to discuss.

W. Sun, J. Gao, X. Liu, Y. Yu, G. Wang, and D. Xu have published "Inverter Nonlinear Error Compensation Using Feedback Gains and Self-Tuning Estimated Current Error in Adaptive Full-Order Observer" on IEEE Transactions on Industry Applications, vol. 52, pp. 472-482, 2016. This paper applies the offline voltage measurement and compensation to build up look-up tables for EMF (back electromotive force) estimation and solve the EMF estimation errors (the EMF estimation errors include switch dead-time, semiconductor voltage drop and inverter resistance voltage). According to the EMF estimation, the angular position of a permanent magnet machine is determined. However, lookup tables are unable to fully solve the EMF estimation error because the dead-time error might not simply depend on phase currents.

The U.S. Pat. No. 9,917,542B2 utilizes a voltage circuit and a current circuit to obtain a phase voltage and a current of the permanent magnet motor. The analog to digital converter is executed to convert the phase voltage and the current into a digital voltage and a digital current. The estimator utilizes the digital voltage and the digital current to determine the angular position of the permanent magnet motor by angular position determination algorithm and Clarke transform. However, the US foregoing patent still needs an analog to digital converter and the phase voltage is not the actual voltage applied to the permanent magnet motor, thereby causing the error of the angular position of the permanent magnet motor.

Accordingly, the inventor of the present invention has designed a sensorless position measurement system for permanent magnet machine and the measuring method thereof to overcome deficiencies in terms of current techniques so as to enhance the implementation and application in industries.

SUMMARY OF THE INVENTION

In view of the aforementioned problems, the present invention aims to provide a sensorless position measurement system for permanent magnet machine and the measuring method thereof to solve the problems encountered in prior art.

On the basis of the purpose as mentioned above, the present invention provides a sensorless position measurement system for permanent magnet machine including an inverter, a preprocessing circuit and a microcontroller. The inverter is provided with a first input terminal, a second input terminal and a third input terminal connecting to the permanent magnet machine. The first input terminal, the second input terminal and the third input terminal respectively provide a first phase PWM signal, a second PWM signal, and a third PWM signal to the permanent magnet machine. The preprocessing circuit couples to the first input terminal, the second input terminal, and the third input terminal to obtain a line-to-line PWM signal of the corresponding two of the first phase PWM signal, the second PWM signal, and the third PWM signal. The preprocessing circuit converts negative PWM pulses of the line-to-line signal into positive PWM pulses to obtain a converted line-to-line PWM signal. The microcontroller couples to the preprocessing circuit and is provided with a capture modulator. The capture modulator implements a digital integration on the converted line-to-line signal to obtain a reconstructed phase PWM signal, and the microcontroller determines an angular position of the permanent magnet machine based on the reconstructed phase PWM signal. Therefore, the sensorless position measurement system for the permanent magnet machine does not need a position sensor to determine the angular position of the permanent magnet machine, thereby reducing the size of the system.

Preferably, the preprocessing circuit comprises a voltage divider, a differential circuit, and a polarity correction circuit; the voltage divider reduces two phase PWM signals of the first phase PWM signal, the second PWM signal and the third PWM signal corresponding to the connected input terminals; the differential circuit generates the line-to-line PWM signal based on the two phase PWM signals; the polarity correction circuit converts negative PWM pulses of the line-to-line signal into positive PWM pulses.

Preferably, the polarity circuit is a negative feedback circuit.

Preferably, the microcontroller implements a phase conversion process and a polarity re-correction process on the converted line-to-line signal.

Preferably, the polarity re-correction process is based on a polarity of the first phase PWM signal, the second PWM signal and the third PWM signal, and the reconstructed phase PWM signal is the same as one of the first phase PWM signal, the second PWM signal and the third PWM signal.

Preferably, the microcontroller utilizes the reconstructed phase PWM signal and a current of the permanent magnet machine to evaluate a back electromotive force by machine field oriented control and position estimation algorithm, and the microcontroller determines the angular position of the permanent magnet machine based on the back electromotive force.

Preferably, the sensorless position measurement system for permanent magnet machine of the present invention further comprises a current sensor to measure the current of the permanent magnet machine.

Preferably, when the permanent magnet machine is at a low speed, the microcontroller still evaluates the back electromotive force to determine the angular position of the permanent magnet machine.

For the abovementioned purpose, the present invention provides a sensorless position measuring method for a permanent magnet machine and the measuring method comprising: (1) utilizing a first input terminal, a second input terminal and a third input terminal of an inverter to respectively provide a first phase PWM signal, a second PWM signal, and a third PWM signal to the permanent magnet machine. (2) utilizing the first input terminal, the second input terminal, and the third input terminal to be coupled to a preprocessing circuit for obtaining a line-to-line PWM signal of the corresponding two of the first phase PWM signal, the second PWM signal, and the third PWM signal. (3) utilizing the preprocessing circuit converting negative PWM pulses of the line-to-line signal into positive PWM pulses to obtain a converted line-to-line PWM signal. (4) utilizing a capture modulator of a microcontroller to implement digital integration on the converted line-to-line signal for obtaining a reconstructed phase PWM signal, and the microcontroller determines an angular position of the permanent magnet machine based on the reconstructed phase PWM signal.

Preferably, the preprocessing circuit comprises a voltage divider, a differential circuit, and a polarity correction circuit; the voltage divider reduces two phase PWM signals of the first phase PWM signal, the second PWM signal and the third PWM signal corresponding to the connected input terminals; the differential circuit generates the line-to-line PWM signal based on the two phase PWM signals; the polarity correction circuit converts negative PWM pulses of the line-to-line signal into positive PWM pulses.

Preferably, the polarity circuit is a negative feedback circuit.

Preferably, the sensorless position measuring method for a permanent magnet machine of the present invention further comprises implementing a phase conversion process and a polarity re-correction process on the converted line-to-line signal by the microcontroller.

Preferably, the polarity re-correction process is based on a polarity of the first phase PWM signal, the second PWM signal and the third PWM signal, and the reconstructed phase PWM signal is the same as one of the first phase PWM signal, the second PWM signal and the third PWM signal.

Preferably, the sensorless position measuring method for a permanent magnet machine of the present invention further comprises utilizing the reconstructed phase PWM signal, a current of the permanent magnet machine, machine field oriented control and position estimation algorithm to evaluate a back electromotive force (EMF) by the microcontroller, and determining the angular position of the permanent magnet machine by the microcontroller based on the back electromotive force.

Preferably, the sensorless position measuring method for a permanent magnet machine of the present invention further comprises a current sensor to measure the current of the permanent magnet machine.

Preferably, when the permanent magnet machine is at a low speed, still evaluating the back electromotive force by the microcontroller for determining the angular position of the permanent magnet machine.

In accordance with the above description, the sensorless position measurement system for a permanent magnet machine and the measuring method thereof may have one or more of the following advantages:

(1) The preprocessing circuit is substituted for the analog to digital converter. Therefore, the sensorless position measurement system for permanent magnet machine and the measuring method thereof does not need the analog to digital converter and simplifies the process for back electromotive force evaluation.

(2) The sensorless position measurement system for the permanent magnet machine and the measuring method thereof does not need position sensor to determine the angular position of the permanent magnet machine, thereby reducing the size of the system.

DETAILED DESCRIPTION OF THE PREFERRED EMBODIMENTS

The advantages, features and technical methods of this invention will be described in detail in order to be understood easier. Moreover, the present invention may be realized in different form and should not be limited to the embodiments described here. On the contrary, the provided embodiments make the disclosure more clear and define the scope of this invention entirely and completely. Further, the present invention is only defined according to the attached claims.

Figure 1:
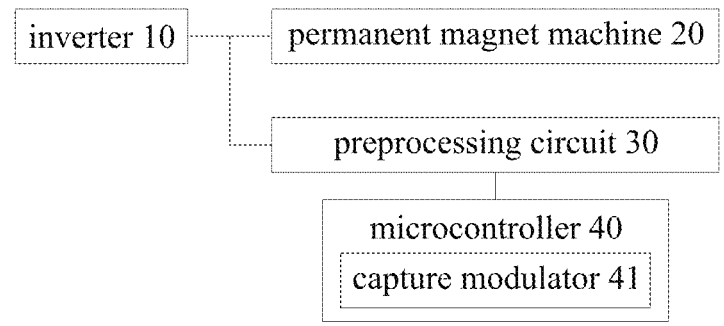
FIG. 1 illustrates the block diagram of the sensorless position measurement system for permanent magnet machine according to the embodiment of the present disclosure.
Figure 2:
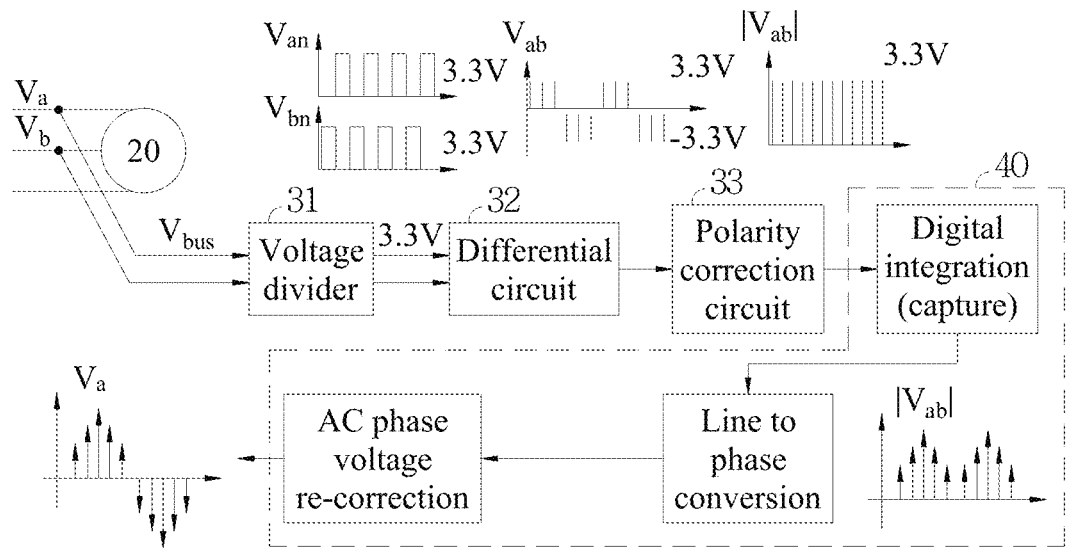
FIG. 2 illustrates the block diagram of the preprocessing circuit according to the embodiment of the present disclosure.

Please refer to FIG. 1 and FIG. 2, which illustrate the block diagram of the sensorless position measurement system for permanent magnet machine and the block diagram of the preprocessing circuit according to the embodiment of the present disclosure. As illustrated in FIG. 1 and FIG. 2, the sensorless position measurement system for permanent magnet machine includes an inverter 10, a preprocessing circuit 30 and a microcontroller 40. The inverter 10 is provided with a first input terminal, a second input terminal and a third input terminal connecting to the permanent magnet machine 20. The first input terminal, the second input terminal and the third input terminal respectively provide a first phase PWM signal, a second PWM signal, and a third PWM signal to the permanent magnet machine 20. The preprocessing circuit 30 couples to two of the first input terminal, the second input terminal, and the third input terminal to obtain a line-to-line PWM signal of the corresponding two of the first phase PWM signal, the second PWM signal, and the third PWM signal. The preprocessing circuit 30 converts negative PWM pulses of the line-to-line signal into positive PWM pulses to obtain a converted line-to-line PWM signal. The microcontroller 40 couples to the preprocessing circuit 30 and is provided with a capture modulator 41. The capture modulator 41 implements a digital integration on the converted line-to-line signal to obtain a reconstructed phase PWM signal, and the microcontroller determines an angular position of the permanent magnet machine based on the reconstructed phase PWM signal. Therefore, the sensorless position measurement system for the permanent magnet machine does not need position sensor to determine the angular position of the permanent magnet machine 20, thereby reducing the size of the system.

In detail, the preprocessing circuit 30 comprises a voltage divider 31, a differential circuit 32, and a polarity correction circuit 33. The voltage divider 31 reduces two phase PWM signals of the first phase PWM signal, the second PWM signal and the third PWM signal corresponding to the connected input terminals. The differential circuit 32 generates the line-to-line PWM signal based on the two phase PWM signals. The polarity correction circuit 33 is a negative feedback circuit and converts negative PWM pulses of the line-to-line signal into positive PWM pulses. Afterward, the capture modulator 41 implements a digital integration on the converted line-to-line signal and the microcontroller 40 implements the phase conversion process on the integrated line-to-line signal for reconstructing a phase PWM signal (referred as a reconstructed phase PWM signal) and the waveform thereof. Based on the polarity of the first phase PWM signal, the second PWM signal and the third PWM signal, the microcontroller 40 implements a polarity re-correction process on the reconstructed phase PWM signal to reconstruct the polarity of the reconstructed phase PWM signal. Therefore, the polarity and the waveform of the reconstructed phase PWM signal are the same as that of one of the first phase PWM signal, the second PWM signal and the third PWM signal.

It needs to be mentioned that the preprocessing circuit 30 may be replaced by the hardware, the program in the microcontroller 40 or the hardware with the program with the same function as the preprocessing circuit, which is not limited by the scope of the present disclosure. The permanent magnet (PM) machine 20 may be the interior PM machine, Surface-Mounted PM machine, or brushless PM machine, which is not limited by the scope of the present disclosure.

It needs to be understood that the preprocessing circuit 30 needs the two of the line-to-line signal between the first phase PWM signal and the second phase PWM signal, the line-to-line signal between the second phase PWM signal and the third phase PWM signal and the line-to-line signal between the third phase PWM signal and the first phase PWM signal for reconstructing phase PWM signal, and one of two line-to-line signals is for reconstructing phase PWM signal and the other one of two line-to-line signals is for reference. And the line-to-line signal and the phase PWM signal is the line-to-line voltage and the phase PWM voltage. Therefore, the sensorless position measurement system for permanent magnet machine may be set that the preprocessing circuit 30 couples the first terminal and the second terminal and obtains the line-to-line voltage $V_{ab}$ between the first PWM phase voltage $V_a$ and the second PWM phase voltage $V_b$. The following paragraph would use the foregoing setting of the sensorless position measurement system for permanent magnet machine. The sensorless position measurement system for permanent magnet machine may be the other setting according to the condition, and is not limited to the scope recited by the disclosure.

Similarly, the voltage divider 31 reduces the first PWM phase voltage $V_a$ and the second PWM phase voltage $V_b$. The differential circuit 32 subtracts the second PWM phase voltage $V_b$ from the first PWM phase voltage $V_a$ and generates the line-to-line voltage $V_{ab}$. The polarity correction circuit 33 and converts negative PWM pulses of the line-to-line voltage $V_{ab}$ into positive PWM pulses and transmits the converted line-to-line voltage $V_{ab}$ to the microcontroller 40. The capture modulator 41 of the microcontroller 40 implements a digital integration and a phase conversion process on the converted line-to-line voltage $V_{ab}$ (referred as the absolute voltage $|V_{ab}|$) to obtain a reconstructed phase PWM voltage (referred as the absolute voltage $|V_a|$) and the waveform thereof. And then, the microcontroller 40 implements a polarity re-correction process on the reconstructed phase PWM voltage to reconstruct the polarity of the reconstructed phase PWM voltage. Therefore, the polarity and the waveform of the reconstructed phase PWM voltage are the same as the first phase PWM voltage $V_a$.

Figure 3:
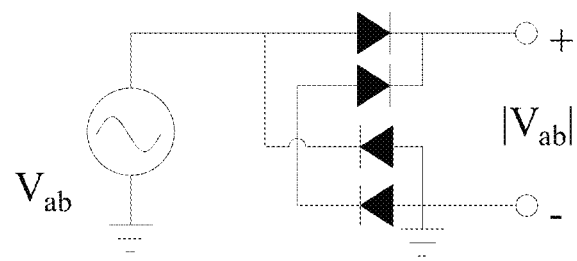
FIG. 3 illustrates the circuit diagram of the full-bridge rectifier.

Please refer to FIG. 3, which illustrates the circuit diagram of the full-bridge rectifier. In general, as illustrated in FIG. 3, the full-bridge rectifier circuit is consisted of multiple diodes to reverse the negative voltages. However, because the line-to-line voltage $V_{ab}$ is a single-ended signal, the full-bridge rectifier circuit is unable to handle negative pulses of the line-to-line voltage $V_{ab}$. Specifically, when the positive pulses of the line-to-line voltage $V_{ab}$ is inputted to the full-bridge rectifier circuit, the full-bridge rectifier circuit outputs the absolute voltage $|V_{ab}|$; when the negative pulses of the line-to-line voltage $V_{ab}$ is inputted to the full-bridge rectifier circuit, the full-bridge rectifier circuit is unable to work because the current is directly shorted to ground. Therefore, the full-bridge rectifier circuit is not appropriate to act as the polarity correction circuit of the present disclosure.

Figure 4:
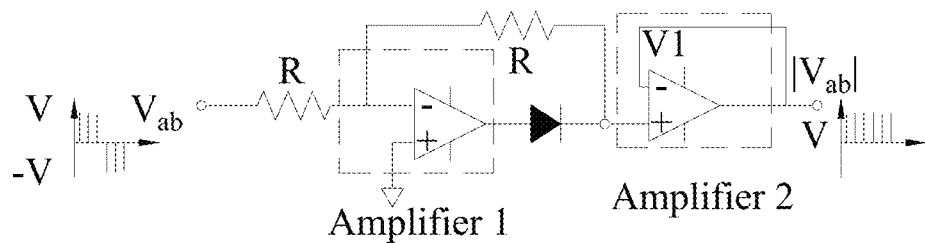
FIG. 4 illustrates the circuit diagram of the polarity correction circuit according to the embodiment of the present disclosure.
Figure 5:
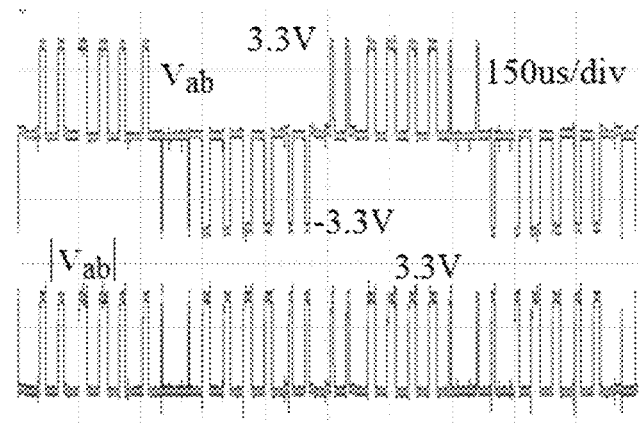
FIG. 5 illustrates the waveform of the line-to-line phase voltage according to the embodiment of the present disclosure.

Please refer to FIG. 4 and FIG. 5, which illustrate the circuit diagram of the polarity correction circuit and the waveform of the line-to-line phase voltage according to the embodiment of the present disclosure. The present disclosure proposes a polarity correction 33 as illustrated in FIG. 4, which is suited for line-to-line voltage $V_{ab}$ and successfully converts negative PWM pulses of the line-to-line voltage $V_{ab}$ into positive PWM pulses. In detail, the negative PWM pulses of the line-to-line voltage $V_{ab}$ is inputted to the Amplifier 1 and converts into positive PWM pulses of the line-to-line voltage $V_{ab}$. The positive PWM pulses of the line-to-line voltage $V_{ab}$ is inputted to the resistance R between the Amplifier 1 and the Amplifier 2, and the positive PWM pulses of the line-to-line voltage $V_{ab}$ still keeps its polarity. Therefore, the polarity correction circuit 33 successfully convert the line-to-line voltage $V_{ab}$ into the absolute voltage $|V_{ab}|$ as illustrated in FIG. 5. Besides, because the Amplifier 1 and the Amplifier 2 are negative feedback element, the polarity correction 33 compensates the forward-bias voltage drop.

Figure 6:
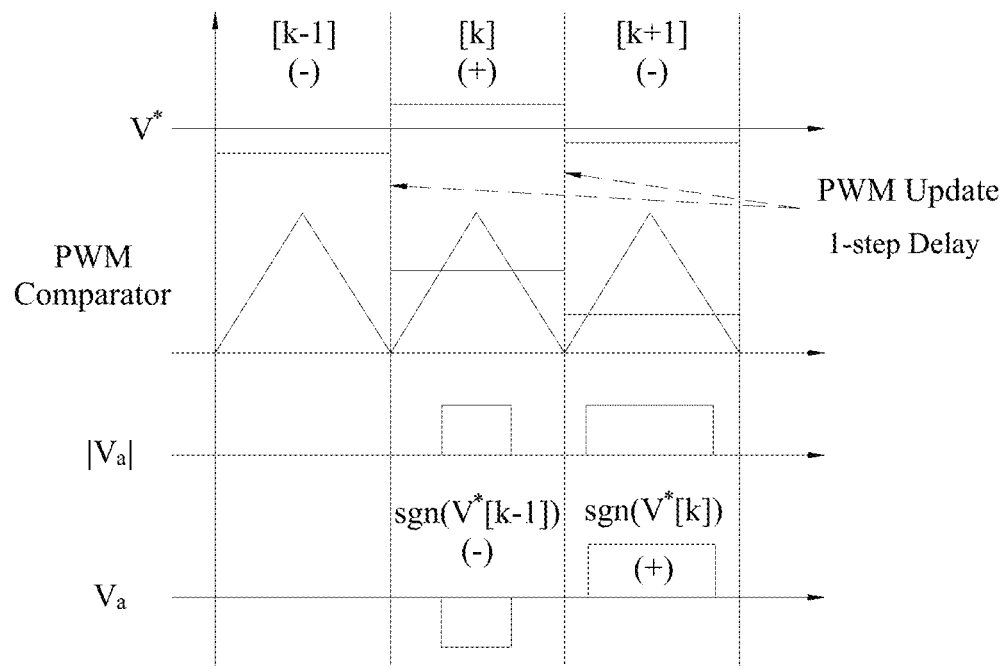
FIG. 6 illustrates the relationship between the phase command voltage and the PWM phase voltage during three intervals according to the embodiment of the present disclosure.

Please refer to FIG. 6, which illustrates the relationship between the phase command voltage and the PWM phase voltage during three intervals according to the embodiment of the present disclosure. As illustrated in FIG. 6, the polarity re-correction process 33 is implemented to convert the absolute voltage $|V_a|$ into the reconstructed voltage $V_a$ based on the polarity of the phase command voltage V* of the microcontroller 40. Because of one step delay in PWM comparator of the microcontroller 40 due to the digital-to-analog conversion, the polarity of last step command voltage sign[V*(k−1)] is used to update the polarity of current step measured phase voltage $V_a(k)$.

Figure 7:
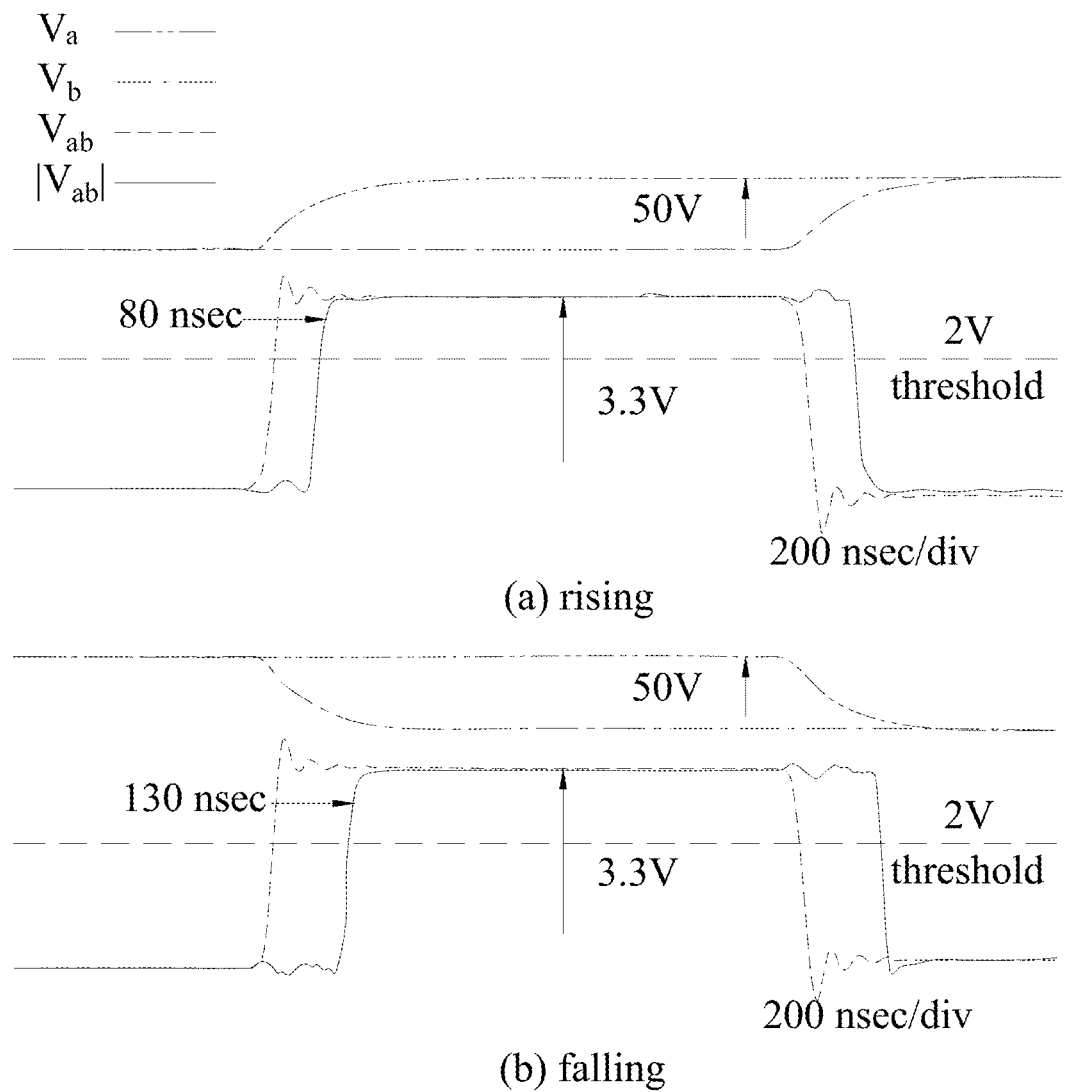
FIG. 7 and FIG. 8 illustrate the waveform of the first phase PWM voltage, the second phase PWM voltage and the line-to-line phase voltage according to the embodiment of the present disclosure.
Figure 8:
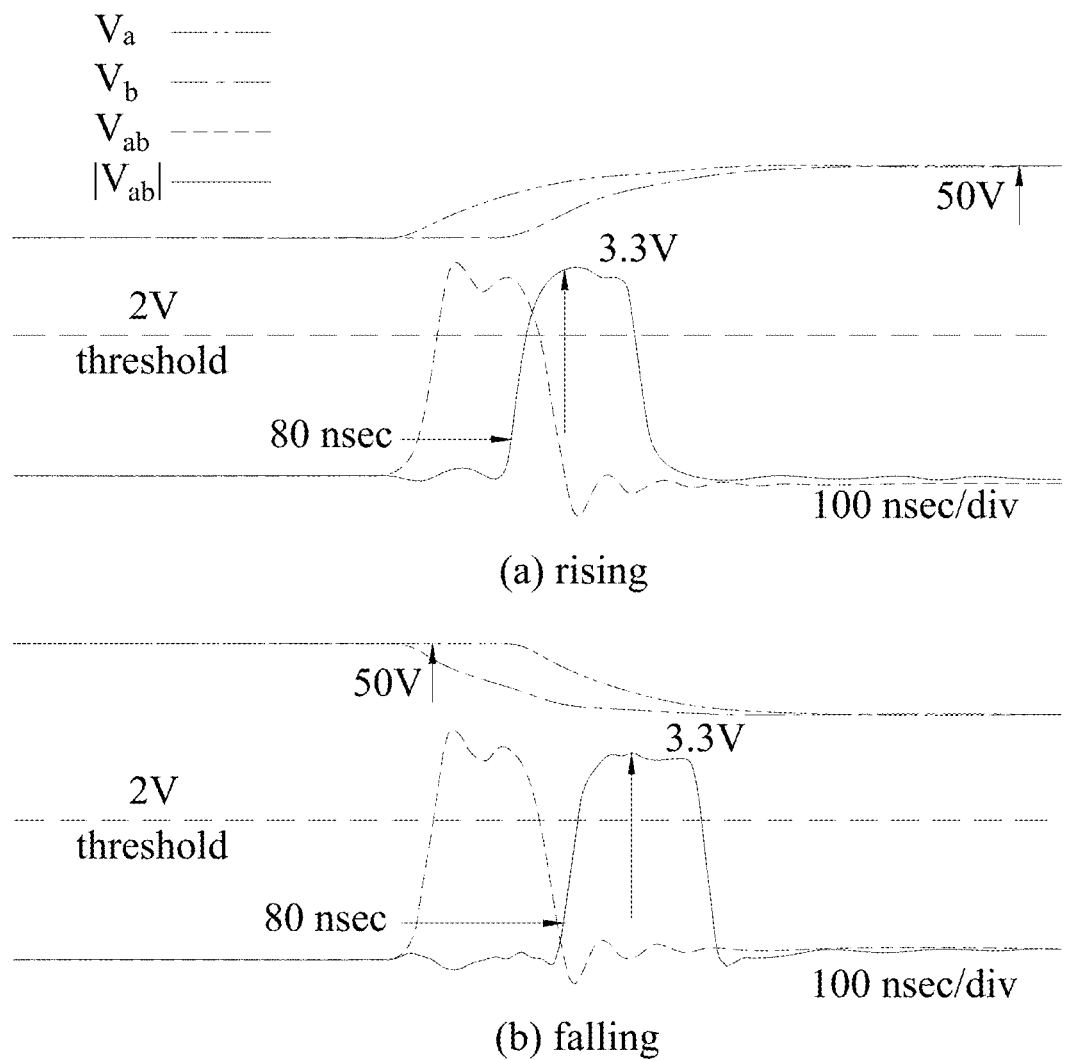

Please refer to FIG. 7 and FIG. 8, which illustrate the waveform of the first phase PWM voltage, the second phase PWM voltage and the line-to-line phase voltage according to the embodiment of the present disclosure. It should be explained that the Amplifier 1 and the Amplifier 2 of the polarity correction circuit 33 may be a wideband operational amplifier, TI-OPA4830, with 280 MHz bandwidth and 560V/μsec (0.56V/nsec) slew rate. Considering the full swing 3.3V logic topology, the measured corresponding propagation delay for the polarity correction circuit 33 is 89.3 nsec and 130 nsec. As FIG. 7 illustrates, the PWM width of the first PWM phase voltage $V_a$, the second PWM phase voltage $V_b$, the line-to-line voltage $V_{ab}$ and the absolute voltage $|V_{ab}|$0 is set as 1% duty circle. It is seen that the polarity correction circuit 33 can reconstruct the absolute voltage $|V_{ab}|$ after 80 nsec propagation delay during the rising edge. By contrast, the propagation delay of the absolute voltage $|V_{ab}|$ during the falling edge is 130 nsec which is slightly longer than the delay during rising edge. This is primary due to the negative feedback of the polarity correction circuit 33.

Next, as illustrated in FIG. 8, the PWM width of the first PWM phase voltage $V_a$, the second PWM phase voltage $V_b$, the line-to-line voltage $V_{ab}$ and the absolute voltage $|V_{ab}|$ is set as 0.1% duty circle. The propagation delay during the rising edge and during falling edge is similar to the propagation delay in FIG. 7. No matter what the PWM width of the first PWM phase voltage $V_a$, the second PWM phase voltage $V_b$, the line-to-line voltage $V_{ab}$ and the absolute voltage $|V_{ab}|$ is, the polarity correction circuit 33 still converts the line-to-line voltage $V_{ab}$ into the absolute voltage $|V_{ab}|$.

Figure 9:
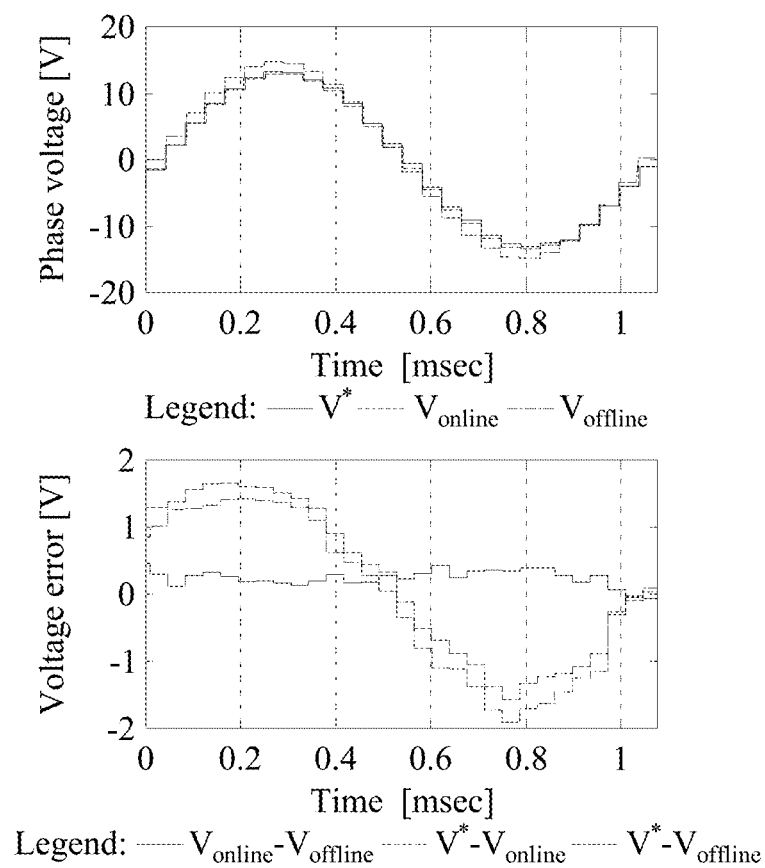
FIG. 9 and FIG. 10 illustrate the phase voltage waveform and the voltage error of the on-line voltage measurement and off-line measurement according to the embodiment of the present disclosure.
Figure 10:
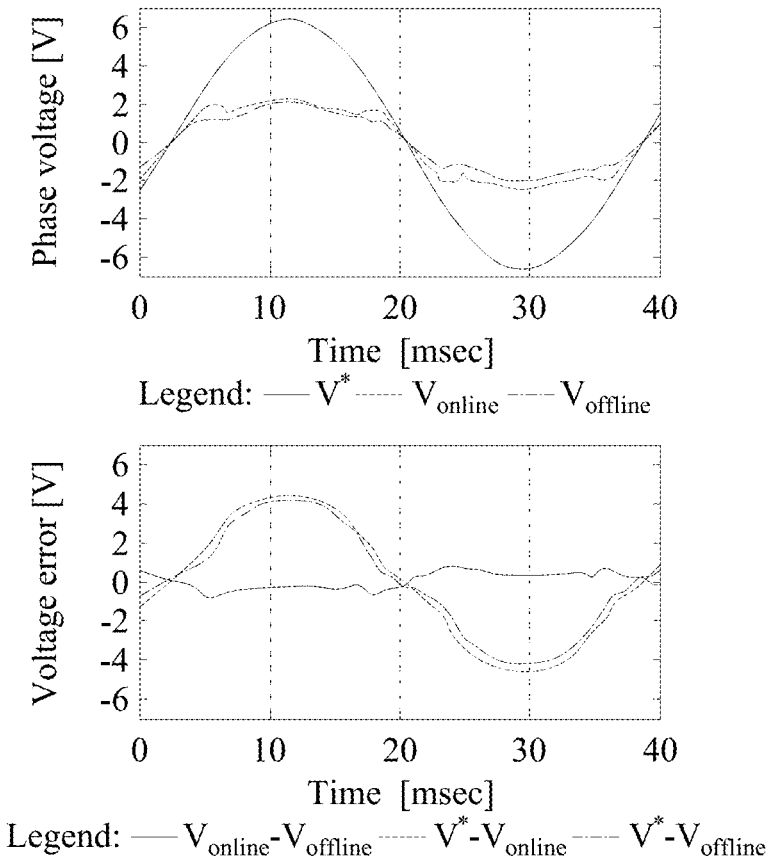

FIG. 9 and FIG. 10 illustrate the phase voltage waveform and the voltage error of the on-line voltage measurement and off-line measurement according to the embodiment of the present disclosure. It needs to be appreciated that the phase command voltage V* is transmitted to the inverter 10 by the microcontroller 40, the on-line voltage $V_{online}$ is the reconstructed phase PWM voltage (the first PWM phase voltage $V_a$) which is captured by the capture modulator 41 and the preprocessing circuit 20 and is reconstructed by the microcontroller 40, and the off-line voltage $V_{offline}$ is the desired voltage which is transmitted to the permanent magnet machine 20 by the setting of Matlab on the computer. As illustrated in FIG. 9, the test of the sensorless position measurement system for permanent magnet machine can be set that the permanent magnet machine 20 is operated at the speed of 6000 rpm with 16% PWM duty cycle, and the deadtime is set at 3 μsec under 10 kHz PWM switching frequency. For the test, a 100 MHz differential probe and 300 MHz scope are used to measure phase PWM voltages. The peak-to-peak error between the on-line voltage $V_{online}$ and the off-line voltage $V_{offline}$ is around 0.4V/13V (3.1%). The voltage modulation error of V*-$V_{online}$ and V*-$V_{offline}$ are respectively 1.7V/13V (13.1%) and 1.9V/13V (14.6%). The voltage drop (about 1.8V) is observed between the command voltage and actual voltage. This voltage drop is primary caused by the deadtime error and semiconductor voltage drop in the inverter 10.

Next, as illustrated in FIG. 10, the test of the sensorless position measurement system for permanent magnet machine can be set that the permanent magnet machine 20 is operated at the speed of 300 rpm with 3% PWM duty cycle. Because of the low PWM duty cycle, visible voltage errors of 4.3V/6.5V (66.2%) with V*-$V_{online}$ and 4.2V/6.5V (64.6%) at V*-$V_{offline}$ are observed. At low PWM duty, it is important to note that more than half of PWM voltage is lost in the actual voltage input due to considerable deadtime effects. In addition, the sinusoidal waveform distortion is found in $V_{online}$ due to the influence of switch parasitic capacitors with low phase currents. Because of the voltage waveform distortion, the degraded drive performance must occur. More importantly considering the position sensorless drive, the significant position estimation errors might appear if the voltage command is directly used for the EMF voltage estimation at low PWM duty.

Figure 11:
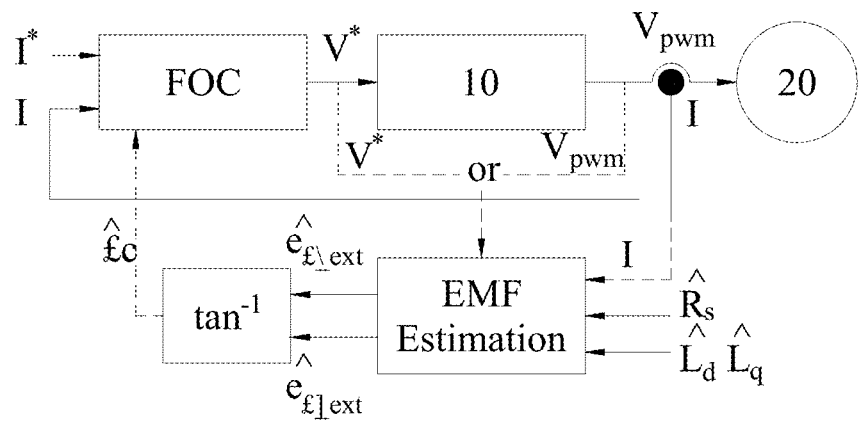
FIG. 11 illustrates signal process of the EMF estimation according to the embodiment of the present disclosure.

Please refer to FIG. 11, which illustrates signal process of the EMF estimation according to the embodiment of the present disclosure. As illustrated in FIG. 11, via reconstructing phase voltage $V_a$ by the preprocessing circuit 30 and the capture modulator 41, utilizing the current sensor to measure the current of the permanent magnet machine 20 and machine field oriented control (FOC), the microcontroller 40 obtains the reconstructed phase voltage $V_a$ and the current and uses the formula 2 and the position estimation algorithm to estimate the angular position of the permanent magnet machine 20 based on the reconstructed voltage $V_a$. The permanent magnet machine 20 has a rotor and a stator. The formula 2 is expressed as follows:

$$\begin{bmatrix} v_\alpha \\ v_\beta \end{bmatrix} = \begin{bmatrix} R_s + pL_d & -\omega_e L_q \\ \omega_e L_q & \hat{R}_s + pL_d \end{bmatrix} \begin{bmatrix} i_\alpha \\ i_\beta \end{bmatrix} + \begin{bmatrix} e_{\alpha\_ext} \\ e_{\beta\_ext} \end{bmatrix} =$$

$$\begin{bmatrix} R_s + pL_d & -\omega_e L_q \\ \omega_e L_q & \hat{R}_s + pL_d \end{bmatrix} \begin{bmatrix} i_\alpha \\ i_\beta \end{bmatrix} +$$

$$|E_{\alpha\beta\_ext}| \begin{bmatrix} -\sin\theta_e \\ \cos\theta_{er} \end{bmatrix}$$

where $v_\alpha$ and $v_\beta$ are αβ voltages of the reconstructed phase voltage $V_a$ in stator-referred stationary frame, $i_\alpha$ and $i_\beta$ are currents of the current, $\theta_e$ and $\omega_e$ are the rotor position and speed, $R_s$ is the stator resistance, and $L_d$ and $L_q$ are respectively d-axis and q-axis inductance in rotor-refer synchronous frame. In addition, $|E_{\alpha\beta\_ext}|$ is the magnitude of extended EMF, $|E_{\alpha\beta\_ext}|$, which is shown by:

$$|E_{\alpha\beta\_ext}| \approx \omega_e[(L_d - L_q)i_d + \lambda_{pm}]$$

where $e_{\alpha\_ext}$ and $e_{\beta\_ext}$ are extended EMF voltages considering the saliency effect and $\lambda_{pm}$ is the magnetic flux of the permanent magnet machine 20.

Therefore, the angular position $\theta_e$ of the permanent magnet machine 20 is estimated by the formula 3. The superscript ^ represents the estimated variable. The formula 3 is expressed as follows:

$$\hat{\theta}_e = \tan^{-1}\left(\frac{-\hat{e}_{\alpha\_ext}}{\hat{e}_{\beta\_ext}}\right)$$

Figure 12:
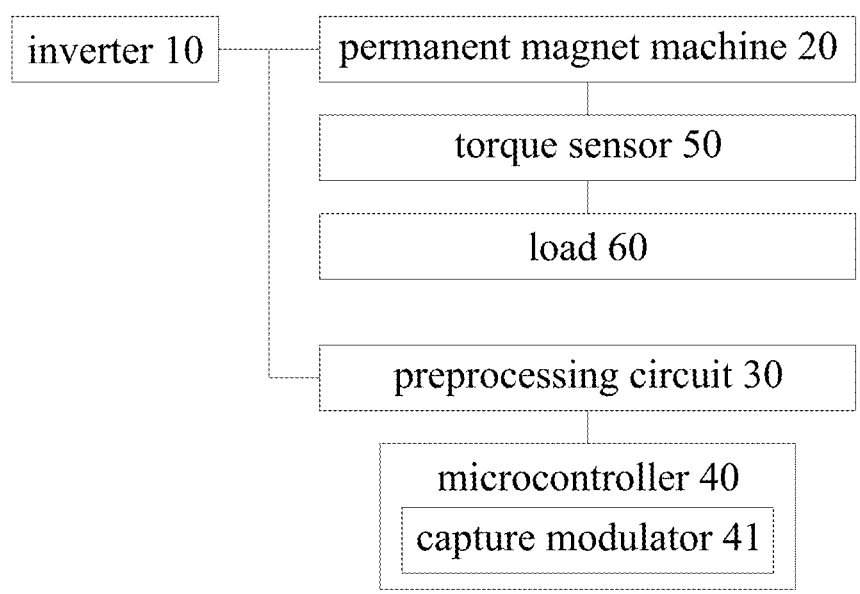
FIG. 12 illustrates the block diagram of the sensorless position measurement system for permanent magnet machine with load according to the embodiment of the present disclosure.

Please refer to FIG. 12, which illustrates the block diagram of the sensorless position measurement system for permanent magnet machine with load according to the embodiment of the present disclosure. As illustrated in FIG. 12, the sensorless position measurement system for permanent magnet machine is executed on the load 60 and uses the torque sensor 50 to connect to the permanent magnetic machine 20 and the load 60. Hence, the permanent magnetic machine 20 and the load 60 would rotate together. The other elements of the FIG. 12 are the same as that of the FIG. 1.

Figure 13:
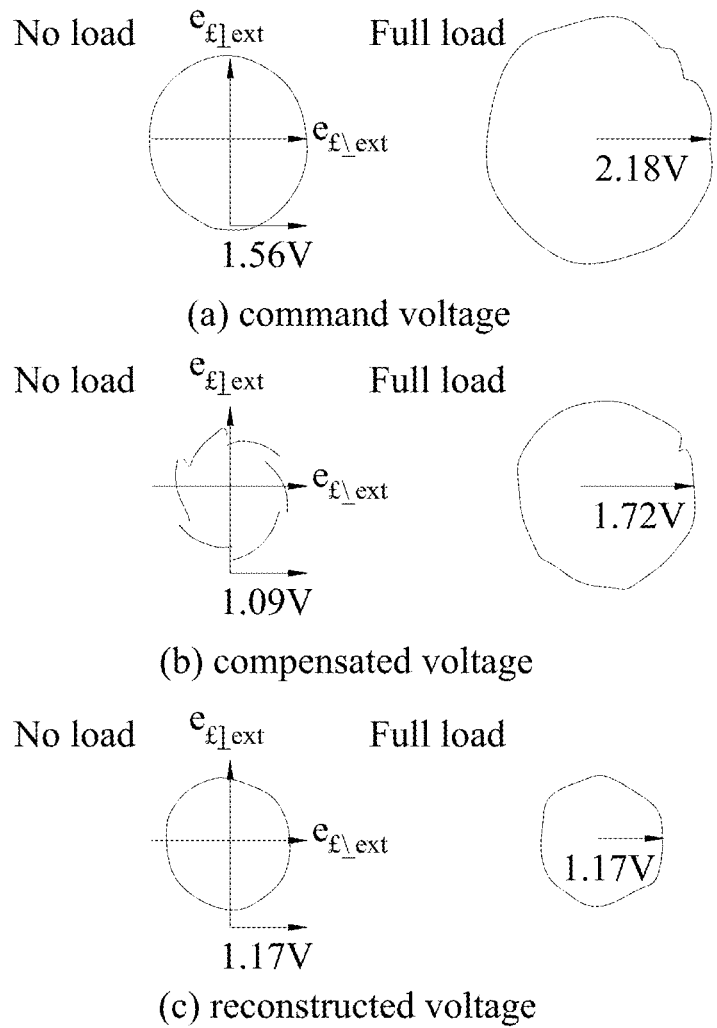
FIG. 13 illustrates the EMF estimation waveform according to the embodiment of the present disclosure.

Please refer to FIG. 13, which illustrates the EMF estimation waveform according to the embodiment of the present disclosure. As illustrated in FIG. 13 and in collocation with the FIG. 11 and FIG. 12, to obtain the angular position $\theta_e$, the EMF estimation is implemented by using the command voltage V*, the compensated voltage $V_{comp}$ (the command voltage V*+ dead-time compensation) and the reconstructed phase voltage $V_a$ and the speed of the permanent magnetic machine 20 is set as 300 rpm. Based on the formula 2, the $\alpha\beta$ voltages v*$_\alpha$ and v*$_\beta$ of the command voltage, the $\alpha\beta$ voltages $v^*_{\alpha\_comp}$ and $v^*_{\beta\_comp}$ of the compensated voltage, and the $\alpha\beta$ voltages v*$_\alpha$ and v*$_\beta$ of the first PWM phase voltage $V_a$ should be calculated for obtaining the $\alpha\beta$ extended EMF voltages $e_{\alpha\_ext}$ and $e_{\beta\_ext}$. As seen in FIG. 13(a) using the $\alpha\beta$ voltages v*$_\alpha$ and v*$_\beta$ of the command voltage V*, the waveform of $\hat{e}_{\alpha\_ext}$ versus $\hat{e}_{\beta\_ext}$ is close to a circle at no load 60. It needs to be understood that at the same speed, the magnitude of $\hat{e}_{\alpha\_ext}$ and $\hat{e}_{\beta\_ext}$ should keep same voltages at different torque loads. Besides, the circle radius of $\hat{e}_{\alpha\_ext}$ versus $\hat{e}_{\beta\_ext}$ should be fixed independent to the load. However, at full load in FIG. 13(a), the radius of $\hat{e}_{\alpha\_ext}$ versus $\hat{e}_{\beta\_ext}$ increases as load increases. In general, the dead-time voltage error varies as the load increases.

Next, as seen in FIG. 13(b) using the $\alpha\beta$ voltages $v^*_{\alpha\_comp}$ and $v^*_{\beta\_comp}$ of the compensated voltage, the magnitude of $\hat{e}_{\alpha\_ext}$ and $\hat{e}_{\beta\_ext}$ is close to actual EMF magnitudes at no load 60. However, a 6th-order harmonic is observed in both $\hat{e}_{\alpha\_ext}$ and $\hat{e}_{\beta\_ext}$, leading to the distortion of circle pattern. The nonlinear capacitor clamping effect limits the dead-time compensation performance at no load. In addition as load increases, the estimated EMF magnitude slightly increases as well. Although the dead-time compensation can reduce the dead-time error, the EMF secondary harmonics and magnitude variation still occurs because the dead-time is a nonlinear voltage error dependent on the load.

Finally, as seen in FIG. 13(c) using the $\alpha\beta$ voltages $v_\alpha$ and $v_\beta$ of the first PWM phase voltage $V_a$, 6th-order EMF harmonic is eliminated since actual voltages are obtained. More importantly, the estimated EMF magnitude maintains the same as load increases. Based on this result, it is concluded that at low speed, the estimated EMF can be insensitive to the dead-time errors of the inverter 10. It is also found that at full load, small amount of EMF harmonics appear due to the flux saturation. The saturation EMF harmonic decoupling further improves the estimation performance.

For conventional sensorless drives, $\alpha\beta$ voltages v*$_\alpha$ and v*$_\beta$ of the command voltage V* before the inverter 10 are used for the EMF estimation. It is assumed that the $\alpha\beta$ voltages v*$_\alpha$ and v*$_\beta$ are sufficiently large and inverter dead-time and device voltage drops are negligible at the high speed operation. However at low speed when $\alpha\beta$ voltages v*$_\alpha$ and v*$_\beta$ of the command voltage V* are small, this assumption might not be valid due to the narrow PWM duty. Dead-time voltage compensation has been implemented to reduce the error between command V*$_\alpha$/v*$_\beta$ and actual $v_\alpha/v_\beta$. However, the inverter dead-time results in nonlinear waveform distortion which is not easily to compensate using the linear inverter model. Under this effect, considerable EMF estimation errors might appear at low speed, leading to the stability issue on sensorless drives.

Figure 14:
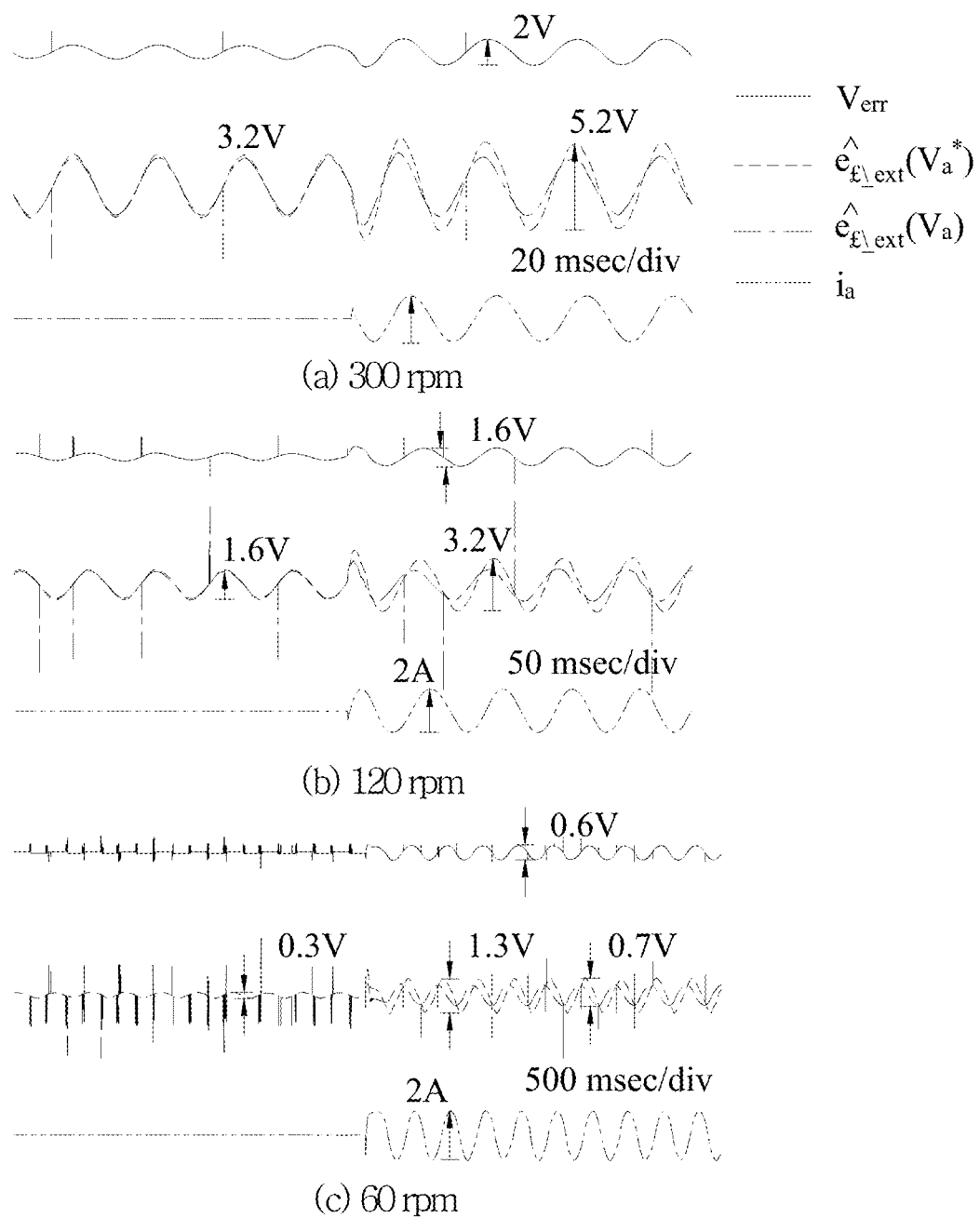
FIG. 14 illustrates the EMF estimation waveform at different loads according to the embodiment of the present disclosure.

Please refer to FIG. 14, which illustrates the EMF estimation waveform at different loads according to the embodiment of the present disclosure. As FIG. 14 illustrated and collocated with the FIG. 12, the sensorless position measurement system for permanent magnet machine operates at different speeds of the load 60 and FIG. 14 shows time-domain waveforms of the current $i_a$ of the permanent magnet machine 20, $\hat{e}_{\alpha\_ext}$ using command voltage V* and the first PWM phase voltage $V_a$, and the estimation error between $\hat{e}_{\alpha\_ext}$(v*$_\alpha$/v*$_\beta$) and $\hat{e}_{\alpha\_ext}$($v_\alpha/v_\beta$). As seen in FIG. 14(a) and FIG. 14(b), when the speed of the load 60 is 300 rpm or 120 rpm, the magnitude of $\hat{e}_{\alpha\_ext}$ estimated by the command voltage V* increases as the load 60 increases, thereby generating the higher estimation error. On the other hand, the magnitude of $\hat{e}_{\alpha\_ext}$ estimated by the first PWM phase voltage $V_a$ keeps the same when the speed of the load 60 is 300 rpm or 120 rpm.

Next, as seen in FIG. 14(c), when the speed of the load 60 is 60 rpm, the load dependency appears on $\hat{e}_{\alpha\_ext}$ even when the sensorless position measurement system for permanent magnet machine is added. It is noted that the EMF voltage magnitude reduces to only 0.33% DC bus at no load. A small resistance variation as load increases might lead to a considerable error on the EMF estimation.

Figure 15:
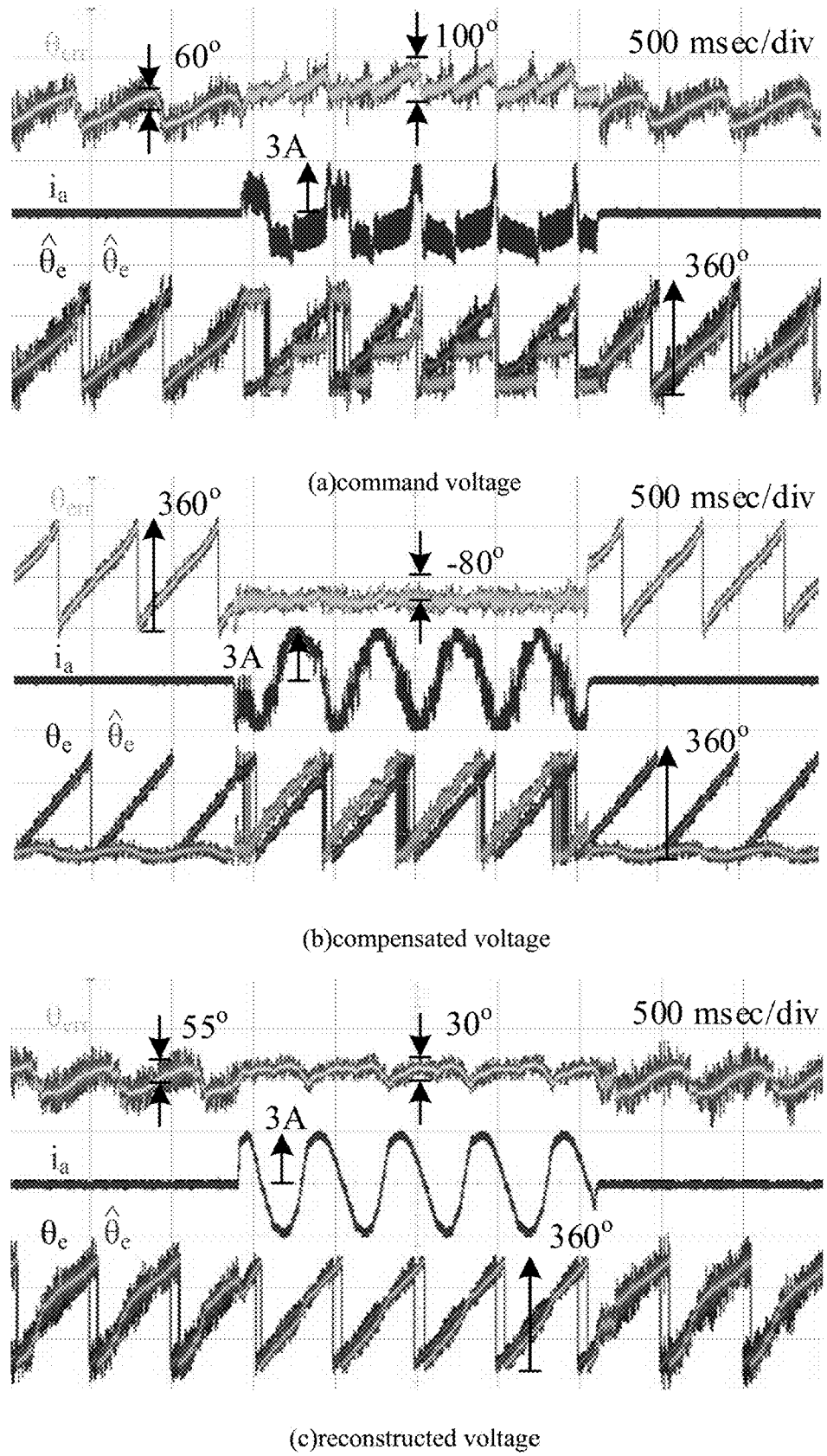
FIG. 15 illustrates the position estimation according to the embodiment of the present disclosure.

Please refer to FIG. 15, which illustrates the position estimation according to the embodiment of the present disclosure. As FIG. 15 illustrated and collocated with the FIG. 12, the sensorless position measurement system for permanent magnet machine utilizes the command voltage V*, the compensated voltage $V_{comp}$ and the first PWM phase voltage $V_a$ to estimate angular position of the permanent magnet machine 20 when the speed of the load 60 is 30 rpm and the current $i_a$ of the permanent magnet machine 20 is discontinuously increased from no load to full load and FIG. 15 shows time-domain waveforms of the current $i_a$ of the permanent magnet machine 20, estimated position $\hat{\theta}_e$, measured position $\theta_e$, and the error of $\hat{\theta}_e$-$\theta_e$. As seen in FIG. 15(a), when the command voltage V* is used for position estimation, the estimated position $\hat{\theta}_e$ might be able to converge at no load though considerable position harmonics are observed. However when a step load is applied, the estimated position $\hat{\theta}_e$ contains a significant amount of error, resulting in the stability issue on the current control.

Next, as seen in FIG. 15(b), when the compensated voltage $V_{comp}$ is used for position estimation, no estimated position signal is obtained at no load due the influence of dead-time harmonics on estimated EMF. When the load increases, dead-time harmonics are compensated and the estimated position $\hat{\theta}_e$ might be able to converge with considerable noises.

Finally, as seen in FIG. 15(c), when the reconstructed voltage $V_a$ is used for position estimation, the estimated position $\hat{\theta}_e$ is still be in convergence at no load. When the load increases, the estimated position $\hat{\theta}_e$ still maintains with reduced position estimation error. Compared with FIG. 15(b), the noises in the current $i_a$ significantly decreases. Based on the foregoing description, it is concluded that the sensorless position measurement system for permanent magnet machine at low speed can be improved with reduced position errors and current noises by using the reconstructed voltage $V_a$.

Figure 16:
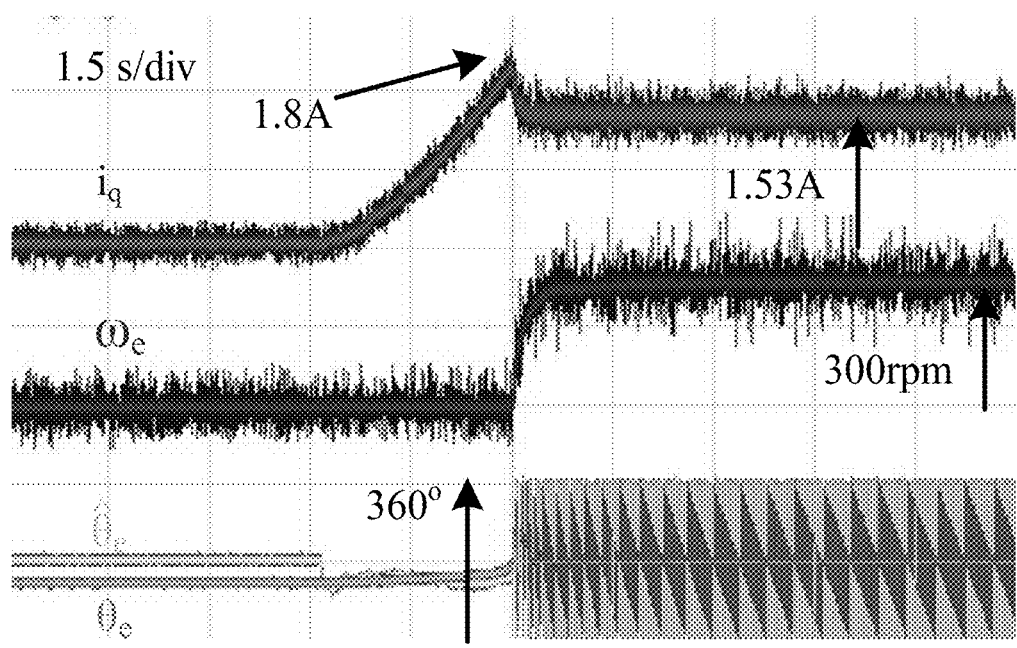
FIG. 16 illustrates the position waveform and the current waveform when the speed of the permanent magnet machine startups from zero to 300 rpm according to the embodiment of the present disclosure.

Please refer to FIG. 16, which illustrates the position waveform and the current waveform when the speed of the permanent magnet machine startups from zero to 300 rpm according to the embodiment of the present disclosure. As FIG. 16 illustrated and collocated with the FIG. 12, the sensorless position measurement system for permanent magnet machine utilizes the first PWM phase voltage $V_a$ to estimate angular position of the permanent magnet machine 20 when the speed of the permanent magnet machine 20 startups from zero to 300 rpm. Although there is a constant position error when the speed of the permanent magnet machine 20 is zero, the estimated position $\hat{\theta}_e$ quickly converges once the rotor of the permanent magnet machine 20 rotates.

Figure 17:
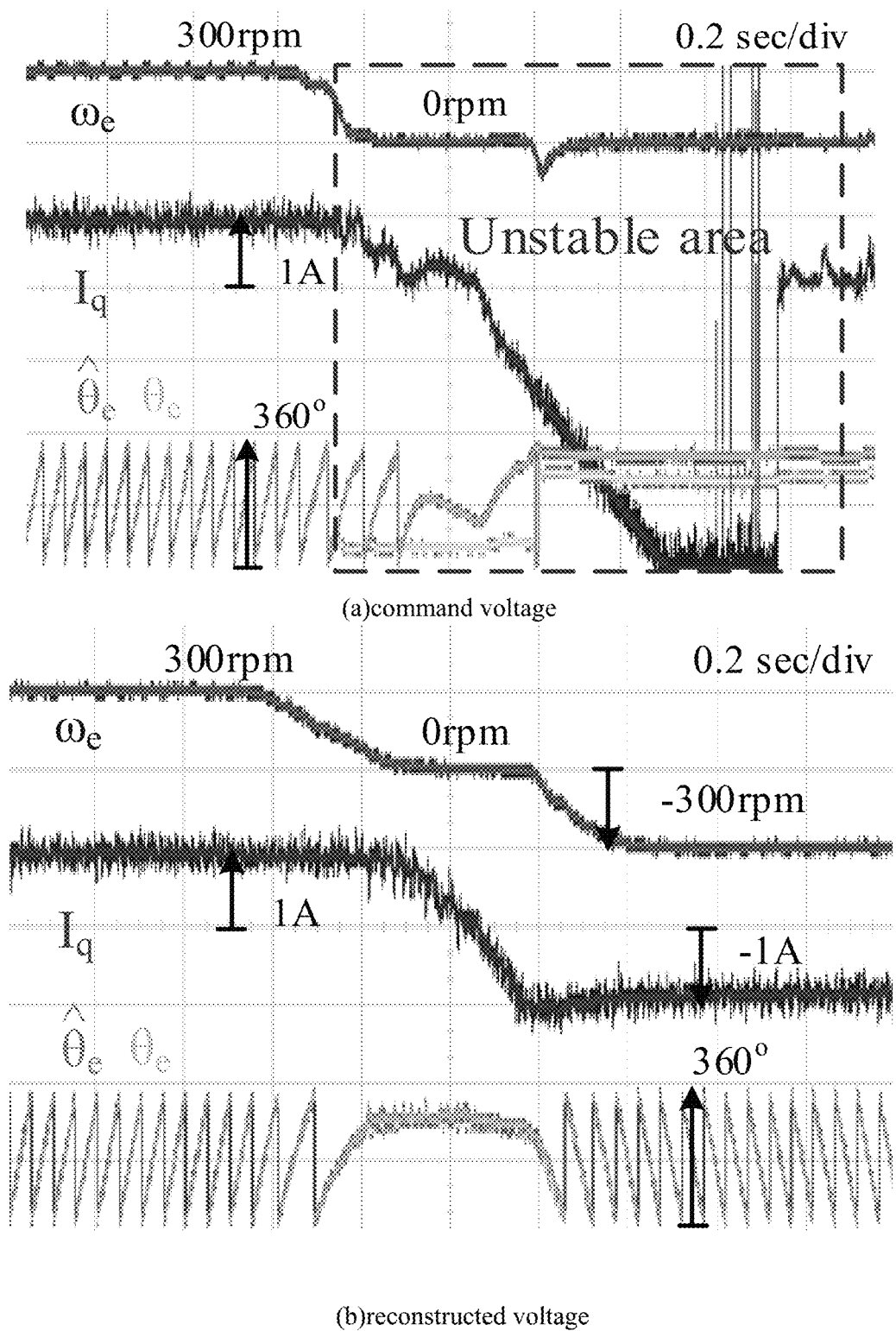
FIG. 17 illustrates the position waveform and the current waveform when the speed of the permanent magnet machine startups from 300 rpm to −300 rpm according to the embodiment of the present disclosure.

Please refer to FIG. 17, which illustrates the position waveform and the current waveform when the speed of the permanent magnet machine startups from 300 rpm to −300 rpm according to the embodiment of the present disclosure. As FIG. 17 illustrated and collocated with the FIG. 12, the sensorless position measurement system for permanent magnet machine utilizes the command voltage V* and the first PWM phase voltage $V_a$ to estimate angular position of the permanent magnet machine 20 when the speed of the permanent magnet machine 20 startups from 300 rpm to −300 rpm and FIG. 17 shows the time-domain waveforms of machine measured speed $\omega_e$, current $I_q$, estimated position $\hat{\theta}_e$ and measured position $\theta_e$ using the command voltage V* and the reconstructed voltage $V_a$. As seen in FIG. 17(a), the command voltage V* is used for position estimation and time-domain. When the speed of the permanent magnet machine 20 is below 150 rpm, there are considerable position estimation errors and harmonics, thereby losing the stability on the current control. As seen in FIG. 17(b), the reconstructed voltage $V_a$ is used for position estimation. No matter what the speed of the permanent magnet machine 20 is, there is no position estimation errors, thereby maintaining the stability on the current control.

Figure 18:
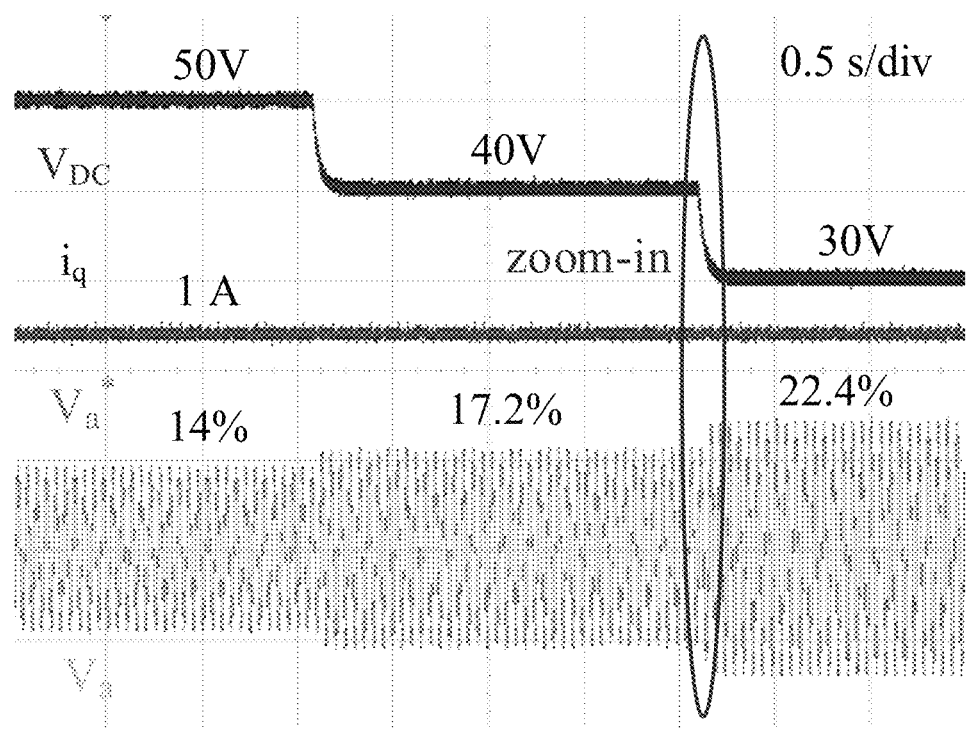
FIG. 18 illustrates the position waveform and the current waveform when the DC bus voltage of the permanent magnet machine startups from 50V to 30V according to the embodiment of the present disclosure.
Figure 18:
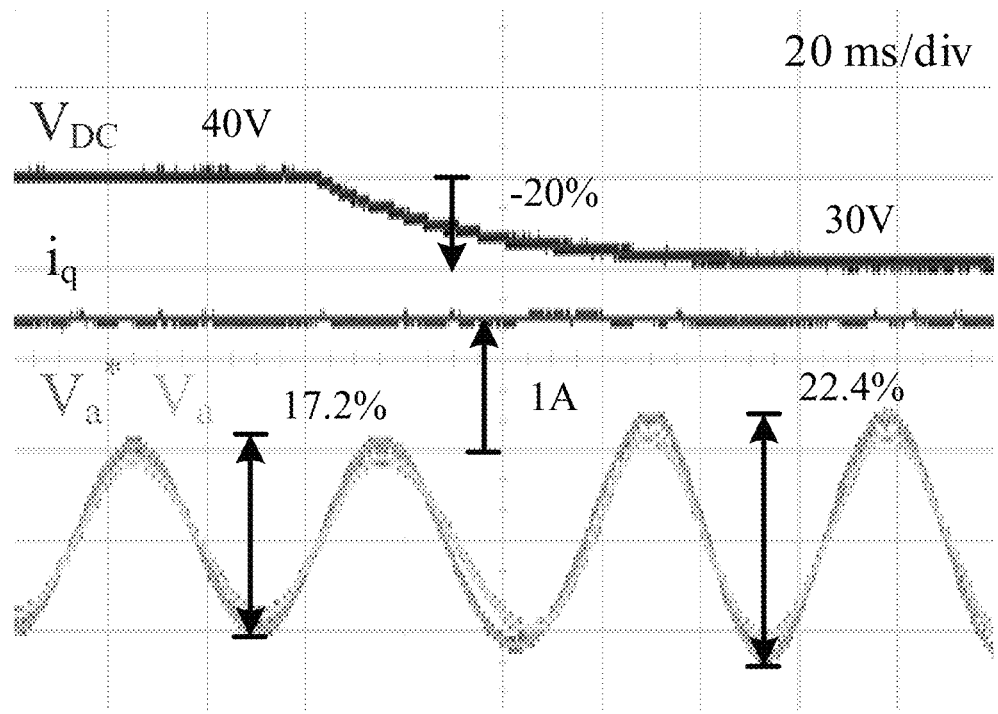

Please refer to FIG. 18, which illustrates the position waveform and the current waveform when the DC bus voltage of the permanent magnet machine startups from 50V to 30V according to the embodiment of the present disclosure. FIG. 18 shows time-domain waveforms of DC bus voltage $V_{DC}$, q-axis current $i_q$, command voltage $V^*_a$ and reconstructed voltage $V_a$ when the DC bus voltage $V_{DC}$ of the permanent magnet machine startups from 50V to 30V. In this test, the per unit value of the command voltage $V^*_a$ and first PWM phase voltage $V_a$ with respect to $V_{DC}$ is used to describe the magnitude change under different $V_{DC}$. As DC bus voltage $V_{DC}$ decreases from 50V to 30V, the percentage of the command voltage $V^*_a$ should increase to maintain the same voltage output. More importantly, the reconstructed voltage $V_a$ still achieves the correct waveform under the change of $V_{DC}$.

In accordance with the above description, the sensorless position measurement system for permanent magnet machine and the measuring method thereof utilizes the preprocessing circuit 30 and the capture modulator 41 of the microcontroller 40 to reconstruct the first PWM phase voltage $V_a$, and the microcontroller 40 estimate the angular position of the permanent magnet machine 20. The sensorless position measurement system for permanent magnet machine and the measuring method thereof does not need the analog to digital converter and simplifies the process of the angular position evaluation. In brief, the sensorless position measurement system and the measuring method thereof has many advantages and does not need the position sensor to know the angular position of the permanent magnet machine 20, thereby reducing the size of the system.

The above description is merely illustrative and not restrictive. Any equivalent modification or change without departing from the spirit and scope of the present disclosure should be included in the appended claims.

What is claimed is:

1. A sensorless position measurement system for a permanent magnet machine, the system comprising:
    an inverter, provided with a first input terminal, a second input terminal and a third input terminal connecting to the permanent magnet machine, the first input terminal, the second input terminal and the third input terminal respectively providing a first phase PWM signal, a second PWM signal, and a third PWM signal to the permanent magnet machine;
    a preprocessing circuit, coupling to the first input terminal, the second input terminal, and the third input terminal to obtain a line-to-line PWM signal of the corresponding two of the first phase PWM signal, the second PWM signal, and the third PWM signal, and converting negative PWM pulses of the line-to-line signal into positive PWM pulses to obtain a converted line-to-line PWM signal; and
    a microcontroller, coupling to the preprocessing circuit, the microcontroller being provided with a capture modulator, the capture modulator implementing a digital integration on the converted line-to-line signal to obtain a reconstructed phase PWM signal, and the microcontroller determining an angular position of the permanent magnet machine based on the reconstructed phase PWM signal.

2. The sensorless position measurement system for the permanent magnet machine according to claim 1, wherein the preprocessing circuit comprises a voltage divider, a differential circuit, and a polarity correction circuit; the voltage divider reduces two phase PWM signals of the first phase PWM signal, the second PWM signal and the third PWM signal corresponding to the connected input terminals; the differential circuit generates the line-to-line PWM signal based on the two phase PWM signals; the polarity correction circuit converts negative PWM pulses of the line-to-line signal into positive PWM pulses.

3. The sensorless position measurement system for the permanent magnet machine according to claim 2, wherein the polarity circuit is a negative feedback circuit.

4. The sensorless position measurement system for the permanent magnet machine according to claim 1, wherein the microcontroller implements a phase conversion process and a polarity re-correction process on the converted line-to-line signal.

5. The sensorless position measurement system for the permanent magnet machine according to claim 4, wherein the polarity re-correction process is based on a polarity of the first phase PWM signal, the second PWM signal and the third PWM signal, and the reconstructed phase PWM signal is the same as one of the first phase PWM signal, the second PWM signal and the third PWM signal.

6. The sensorless position measurement system for the permanent magnet machine according to claim 1, wherein the microcontroller utilizes the reconstructed phase PWM signal and a current of the permanent magnet machine to evaluate a back electromotive force (EMF) by machine field oriented control and position estimation algorithm, and the microcontroller determines the angular position of the permanent magnet machine based on the back electromotive force.

7. The sensorless position measurement system for the permanent magnet machine according to claim 6, further comprising a current sensor to measure the current of the permanent magnet machine.

8. The sensorless position measurement system for the permanent magnet machine according to claim 6, wherein, when the permanent magnet machine is at a low speed, the microcontroller evaluates the back electromotive force to determine the angular position of the permanent magnet machine.

9. A sensorless position measuring method for a permanent magnet machine, the method comprising:
- utilizing the first input terminal, the second input terminal and the third input terminal of an inverter respectively providing a first phase PWM signal, a second PWM signal, and a third PWM signal to the permanent magnet machine;
- utilizing the first input terminal, the second input terminal, and the third input terminal coupling to a preprocessing circuit for obtaining a line-to-line PWM signal of the corresponding two of the first phase PWM signal, the second PWM signal, and the third PWM signal;
- utilizing the preprocessing circuit converting negative PWM pulses of the line-to-line signal into positive PWM pulses to obtain a converted line-to-line PWM signal; and
- utilizing a capture modulator of a microcontroller implementing a digital integration on the converted line-to-line signal to obtain a reconstructed phase PWM signal, and the
- microcontroller determining an angular position of the permanent magnet machine based on the reconstructed phase PWM signal.

10. The sensorless position measuring method for the permanent magnet machine of claim 9, wherein the preprocessing circuit comprises a voltage divider, a differential circuit, and a polarity correction circuit; the voltage divider reduces two phase PWM signals of the first phase PWM signal, the second PWM signal and the third PWM signal corresponding to the connected input terminals; the differential circuit generates the line-to-line PWM signal based on the two phase PWM signals; the polarity correction circuit converts negative PWM pulses of the line-to-line signal into positive PWM pulses.

11. The sensorless position measuring method for the permanent magnet machine according to claim 10, wherein the polarity circuit is a negative feedback circuit.

12. The sensorless position measuring method for the permanent magnet machine according to claim 9, further comprising implementing a phase conversion process and a polarity re-correction process on the converted line-to-line signal by the microcontroller.

13. The sensorless position measuring method for the permanent magnet machine according to claim 12, wherein the polarity re-correction process is based on a polarity of the first phase PWM signal, the second PWM signal and the third PWM signal, and the reconstructed phase PWM signal is the same as one of the first phase PWM signal, the second PWM signal and the third PWM signal.

14. The sensorless position measuring method for the permanent magnet machine according to claim 9, further comprising utilizing the reconstructed phase PWM signal, a current of the permanent magnet machine, machine field oriented control and position estimation algorithm to evaluate a back electromotive force (EMF) by the microcontroller, and determining the angular position of the permanent magnet machine by the microcontroller based on the back electromotive force.

15. The sensorless position measuring method for the permanent magnet machine according to claim 14, further comprising a current sensor to measure the current of the permanent magnet machine.

16. The sensorless position measuring method for the permanent magnet machine according to claim 14, wherein, when the permanent magnet machine is at a low speed, still evaluating the back electromotive force by the microcontroller for determining the angular position of the permanent magnet machine.

* * * * *